United States Patent
Grooters

(10) Patent No.: US 10,906,454 B2
(45) Date of Patent: Feb. 2, 2021

(54) WHEEL LOCK INDICATOR

(71) Applicant: Daniel Christopher Grooters, Grand Rapids, MI (US)

(72) Inventor: Daniel Christopher Grooters, Grand Rapids, MI (US)

( * ) Notice: Subject to any disclaimer, the term of this patent is extended or adjusted under 35 U.S.C. 154(b) by 0 days.

(21) Appl. No.: 16/699,666

(22) Filed: Dec. 1, 2019

(65) Prior Publication Data
US 2020/0172003 A1 Jun. 4, 2020

Related U.S. Application Data

(60) Provisional application No. 62/917,298, filed on Dec. 3, 2018.

(51) Int. Cl.
| | | |
|---|---|---|
| *B60Q 1/32* | (2006.01) | |
| *B60Q 1/50* | (2006.01) | |
| *F21V 21/096* | (2006.01) | |
| *F21V 23/04* | (2006.01) | |
| *B60R 16/033* | (2006.01) | |
| *F21Y 115/10* | (2016.01) | |

(52) U.S. Cl.
CPC .............. *B60Q 1/326* (2013.01); *B60Q 1/50* (2013.01); *B60R 16/033* (2013.01); *F21V 21/096* (2013.01); *F21V 23/04* (2013.01); *F21Y 2115/10* (2016.08)

(58) Field of Classification Search
CPC .............................. B60Q 1/326; F21V 21/096
USPC ....................................................... 362/500
See application file for complete search history.

(56) References Cited

U.S. PATENT DOCUMENTS

| | | | |
|---|---|---|---|
| 6,220,733 B1 | 4/2001 | Gordon | |
| 7,377,676 B2 | 5/2008 | Thomas et al. | |
| 2015/0343942 A1* | 12/2015 | Vaughn | B60B 7/006 |
| | | | 362/545 |

FOREIGN PATENT DOCUMENTS

| | | |
|---|---|---|
| CN | 203336338 U | 12/2013 |
| CN | 207179286 U | 4/2018 |

OTHER PUBLICATIONS

Skidd Stick captured online at https://web.archive.org/web/20181109161417/http://www.skiddd.com/benefits.php on Dec. 1, 2019 (archived online on Nov. 9, 2018).
Tire Anti-Skid Stick, captured from https://web.archive.org/web/20170424225959if_/http://mdltd.ca/images/MD-tirestick-flyer-new.pdf on Dec. 1, 2019 (archived on Jun. 8, 2018).

* cited by examiner

*Primary Examiner* — Sean P Gramling
(74) *Attorney, Agent, or Firm* — Oppenhuizen Law PLC; David L. Oppenhuizen

(57) ABSTRACT

A wheel lock indicator for use with wheels on a tractor trailer. The wheel lock indicator includes an elongated bar having a first end, a second end, and a medial portion. The second end includes a light that is configured to be selectively turned on or off, while the first end has a magnetized portion to secure the first end to the wheel on the tractor trailer.

12 Claims, 2 Drawing Sheets

WHEEL LOCK INDICATOR

CROSS REFERENCE TO RELATED APPLICATION

This application claims the benefit of U.S. Provisional Application 62/917,298, which was filed on Dec. 3, 2018, the disclosure of which is hereby incorporated by reference.

BACKGROUND OF THE INVENTION

1. Field of the Invention

The present disclosure pertains to a wheel lock indicator. More particularly, the present invention pertains to a wheel lock indicator adapted for attachment to a wheel of a vehicle and is suitable for indicating a locked condition of the wheel.

2. Description of the Prior Art

In cold weather, the air brakes on a vehicle, such as tractor trailer, can lock up, causing a locking of the wheel's rotation. It is difficult for a driver of the vehicle to determine if the wheels are locked up, especially at night. If the wheels are locked, then it can be an expensive repair because the wheels, generally, need to be replaced.

SUMMARY OF THE INVENTION

According to an embodiment of the present invention, a wheel lock indicator for use with wheels on a tractor trailer is disclosed. The wheel lock indicator includes an elongated bar having a first end, a second end, and a medial portion. The second end includes a light that is configured to be selectively turned on or off, while the first end has a magnetized portion to secure the first end to the wheel on the tractor trailer.

For a more complete understanding of the present invention, reference is made to the following detailed description and accompanying drawings. In the drawings, like reference characters refer to like parts throughout the views in which:

DETAILED DESCRIPTION OF A PREFERRED EMBODIMENT

Figure 1:
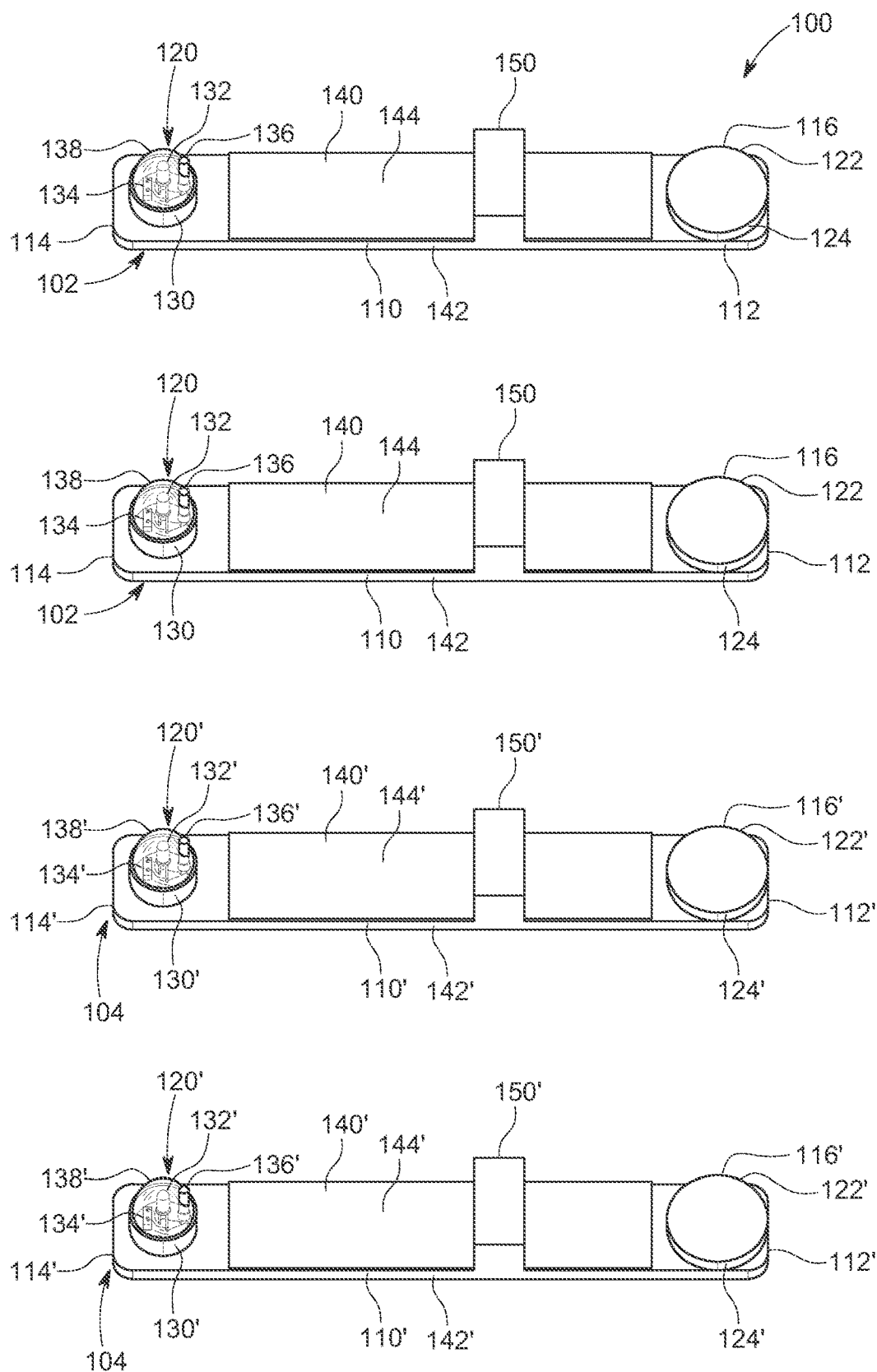
FIG. 1 illustrates a diagrammatic view of a kit including a pair of first wheel lock indicators and a pair of second wheel lock indicators, in accordance with an embodiment of the disclosure.

Referring to FIG. 1, an exemplary kit 100 having a plurality of wheel lock indicators is shown. The kit 100 includes a pair of first wheel lock indicators 102 and a pair of second wheel lock indicators 104 for indicating if a vehicle's wheels are locked during driving. Although it is contemplated that the kit 100 has two first wheel lock indicators 102 and two second wheel lock indicators 104, it may be appreciated that the kit 100 may include a single first wheel lock indicator 102 and a single second wheel lock indicator 104 or any other number of the first wheel lock indicators 102 and the second wheel lock indicators 104. In certain implementations, the second wheel lock indicators 104 may be omitted, and the kit may include only the first wheel lock indicators 102.

Figure 2:
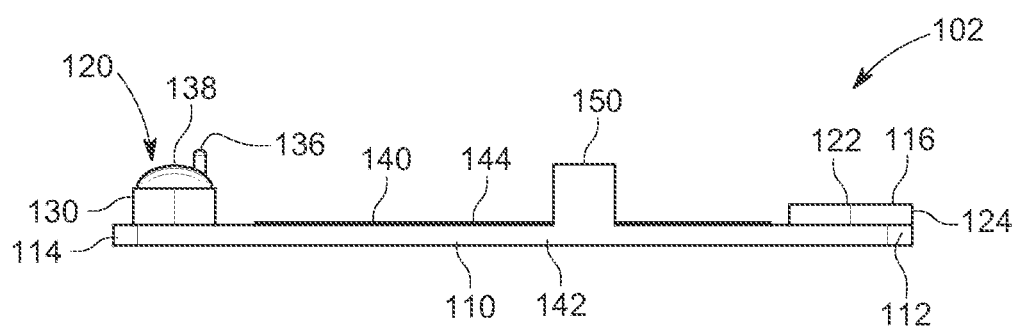
FIG. 2 illustrates a side view of the first wheel lock indicator of the kit, in accordance with an embodiment of the disclosure.

Referring to FIGS. 1 and 2, the first wheel lock indicator 102 (herein referred to as the first indicator 102) includes an elongated plate 110 or bar having a first end 112 and a second end 114, a coupling structure 116 disposed proximate to the first end 112 of the elongated plate 110, and a light assembly 120 attached to the elongated plate 110 and disposed proximate to the second end 114. The coupling structure 116 facilitates a removable engagement of the elongated plate 110 with a wheel of the vehicle. Preferably, the coupling structure 116 is a magnet 122 attached to the elongated plate 110. In an embodiment, the elongated plate 110 is made of iron or other materials capable of magnetically interacting with a magnetic field. In such a case, the magnet 122 may be integrated within the first end 112 of the elongated plate 110. In his manner, the elongated plate 110 may include a magnetized portion 124 for facilitating a magnetic coupling of the first indicator 102 with the rim of the wheel. Alternatively, the magnet 122 may be attached to the elongated plate 110 by using an adhesive, fasteners, welding, or any other attachment means well-known in the art. The magnet 122 facilitates an easy attachment and removal of the first indicator 102 with a rim of the wheel.

The light assembly 120 also includes a housing 130, a light source 132 disposed inside the housing 130, a power source (such as a battery 134, to provide an electric power to the light source 132), and a switch 136 for selectively connecting or disconnecting the light source 132 from the battery 134. The housing is adapted to house the battery 134, the light source 132, and the switch 136, although the switch 136 may partly extend outside the housing 130 to enable switching on and/or switching off of the light source 132. Preferably, the housing 130 is a waterproof housing to prevent an ingress of water inside the housing 130 to prevent a damage to the light source 132 and/or the battery 134. Further, the housing 130 may include a transparent portion 138 that allows a transmission of the light emitted by the light source 132 to an ambient.

The switch 136 is adapted to move to a first position in which the light source 132 is electrically connected to the battery 134, and a second position in which the light source 132 is electrically disconnected from the battery 134. Accordingly, the light source 132 is switched on when the switch 136 is moved to the first position, while the light source 132 is switched off upon moving the switch 136 to the second position. Preferably, the light source 132 may include one or more light emitting diodes (LEDs). Although, the one or more LEDs are contemplated as the light source 132, it may be appreciated that the light source 132 may include an incandescent bulb or any other source of light. In an embodiment, the light source 136 generates light of a specified or predetermined color. For example, the light source 132 may emit light which is visibly red in color.

Further, the first indicator 102 may include a reflector 140 connected to the elongated plate 110 to reflect the light, such as ambient light or the light emitted from the light source 132 to facilitate an easy visibility of the first indicator 102 from a cab of the vehicle. Preferably, the reflector 140 may be disposed at the medial portion 142 of the elongated plate 110 and may be located between the coupling structure 116 (i.e. the magnet 122) and the light assembly 120. Preferably, the reflector 140 is a reflective tape 144 that glows upon an incidence of the light. In such a case, the reflective tape 144 is preferably the same color as that of the color of the light emitted by the light source 132. In an embodiment, the reflective tape 144 may be a red color reflective tape. In certain implementations, the reflector 140 may be a spherical reflector (not shown) disposed surrounding the light source 132 to reflect the light from the light source 132 in a direction towards the cab of the vehicle.

Additionally, or optionally, the first indicator 102 may include a lip stop 150 disposed between the coupling structure 116 and the light assembly 120. The lip stop 150 may be located proximate to the coupling structure 116. Preferably, the lip stop 150 is a protrusion extending outwardly from a surface of the elongated plate 110 and is adapted to be engaged with a complimentary groove (not shown) of the rim of the wheel when the first indicator 102 is attached to the rim. Accordingly, the lip stop 150 helps retain the first indicator 102 with the wheel, which is particularly beneficial if the first indicator 102 is left attached to the rim while the vehicle is traveling.

Figure 3:
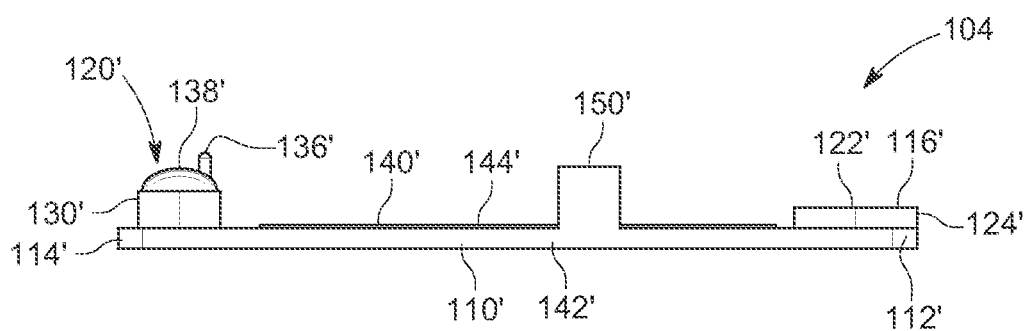
FIG. 3 illustrates a side view of the second wheel lock indicator, in accordance with an embodiment of the disclosure.

Referring to FIGS. 1 and 3, the second wheel lock indicator 104 (hereinafter referred to as second indicator 104) is similar in structure, construction, and function to the first indicator 102 except that a light source 132' of the second indicator 104 emits a light that has a color different from the color of the light emitted by the light source 132 of the first indicator 102. Similar to the first indicator 102, the second indicator 104 may include an elongated plate 110' or bar having a first end 112', a second end 114', medial portion 142', a coupling structure 116' having a magnet 122' (and thereby defining a magnetized portion 124' of the elongated plate 110'), a light assembly 120', a reflector 140', and a lip stop 150'. The light assembly 120' includes the housing 130' having a transparent portion 138', the light source 132', the switch 136', and the battery 134'. Moreover, in an embodiment, the reflector 140' includes a reflective tape 144' having a color same as that of the light emitting from the light source 132'. Preferably, the light source 132' of the second indicator 104 may emit light that is visibly the color yellow, and the reflective tape 144' may include a yellow color (whereas the reflective tape 144 of the first indicator 102 includes a red color). In certain implementations, the reflective tape 144, 144' may include a white color.

An application of the kit 100 is now explained. In use, the kit 100 is installed on a trailer having two wheels on the left side and two wheels on the right side. In such a case, one first indicator 102 may be mounted on one of the two left wheels and one second indicator 104 may be mounted on another of the two left wheels. In an exemplary implementation, the first indicator 102 may be mounted on the front left wheel and the second indicator 104 may be mounted on the rear left wheel. Similarly, the right front wheel may include the first indicator 102 and the right rear wheel may include the second indicator 104. Further, before starting vehicle, a driver or an operator of the vehicle may operate the switch 136 of each of the first indicators 102 to move the switch 136 to the first position to cause an illumination of the associated light source 132. Similarly, the driver may operate the switch 136' of each of the second indicators 104 to the second position to cause an illuminator of the light source 132' of each of the second indicators 104.

Thereafter, the driver may start the vehicle and move forward or rearward. As the wheels rotate, the first indicators 102 and the second indicators 104 also rotate along the wheel, thereby indicating to the driver that that particular wheel is not rotatably locked. It is known that air brakes can fail (such as from frozen water in the brake lines), which will lock the wheels from rotating. For example, the front left wheel may get locked while stationary, and therefore a rotation of the front left wheel is stopped, causing a stoppage of the rotation of the first indicator 102. The operator may notice the stoppage of the rotation of the first indicator 102 by viewing the light coming from the first indicator 102 in a left side mirror of the vehicle. In this manner, the operator of the vehicle can easily detect a locking of the wheel at night, thereby preventing damage to the wheel.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The exemplary embodiment was chosen and described in order to best explain the principles of the present disclosure and its practical application, to thereby enable others skilled in the art to best utilize the present disclosure and various embodiments with various modifications as are suited to the particular use contemplated.

I claim:

1. A wheel lock indicator for use with wheels on a tractor trailer, the wheel lock indicator comprising an elongated bar having a second end, a first end, and a medial portion, the first end having a magnetized portion to secure the first end to the wheel on the tractor trailer, the medial portion including a light reflector and a lip stop, the lip stop being a protrusion extending outwardly from the medial portion of the elongated bar and configured to engage with a complimentary groove on the wheels of the tractor trailer.

2. The wheel lock indicator of claim 1 wherein the second end includes a light that is configured to be selectively turned on or off.

3. The wheel lock indicator of claim 1 wherein the magnetized portion comprises a magnet secured to the first end of the bar.

4. The wheel lock indicator of claim 2 wherein the magnetized portion comprises a magnet secured to the first end of the bar.

5. The wheel lock indicator of claim 4 wherein the light includes a light-emitting diode.

6. The wheel lock indicator of claim 5 wherein the light includes a power source and a switch such that a user can selectively illuminate the light by activating the switch.

7. The wheel lock indicator of claim 2 wherein the light includes a light-emitting diode.

8. The wheel lock indicator of claim 7 wherein the light includes a power source and a switch such that a user can selectively illuminate the light by activating the switch.

9. The wheel lock indicator of claim 3 wherein the second end includes a light that is configured to be selectively turned on or off, and the light includes a light-emitting diode.

10. The wheel lock indicator of claim 9 wherein the light includes a power source and a switch such that a user can selectively illuminate the light by activating the switch.

11. A kit comprising a plurality of wheel lock indicators for use with wheels on a tractor trailer, the wheel lock indicators having an elongated bar having a second end, a first end, and a medial portion, the second end including a light that is configured to be selectively turned on or off, and the first end having a magnetized portion to secure the first end to the wheel on the tractor trailer, wherein at least one wheel lock indicator has a light that is a first color, and at least one wheel lock indicator that has a light that is a second color, the first color and second color being different colors from one another.

12. The kit of claim 11 wherein there is provided two wheel lock indicators having lights that are the first color, and two wheel lock indicators having lights that are the second color.

* * * * *